United States Patent [19]

Cope

[11] 4,304,001

[45] Dec. 1, 1981

[54] INDUSTRIAL CONTROL SYSTEM WITH INTERCONNECTED REMOTELY LOCATED COMPUTER CONTROL UNITS

[75] Inventor: Michael E. Cope, Richardson, Tex.

[73] Assignee: Forney Engineering Company, Addison, Tex.

[21] Appl. No.: 115,161

[22] Filed: Jan. 24, 1980

[51] Int. Cl.³ .................... G06F 11/08; G06F 11/16
[52] U.S. Cl. .................................... 371/8; 340/870.37; 340/825.01; 371/32; 371/68; 371/69
[58] Field of Search ................... 371/8, 32, 33, 68, 69; 340/200, 147 SC

[56] References Cited

U.S. PATENT DOCUMENTS

| | | | |
|---|---|---|---|
| 2,512,038 | 6/1950 | Potts | 178/2 R |
| 2,997,540 | 8/1961 | Ertman et al. | 178/23 A |
| 3,195,107 | 7/1965 | Rudolph | 371/68 |
| 3,665,395 | 5/1972 | Bochmann | 371/8 |
| 3,699,529 | 10/1972 | Beyers | 364/200 |
| 3,754,211 | 8/1973 | Rocher et al. | 371/33 |
| 3,772,649 | 11/1973 | Haselwood et al. | 371/69 |
| 3,806,885 | 4/1974 | Moore | 364/200 |
| 4,082,922 | 4/1978 | Chu | 370/80 |
| 4,136,384 | 1/1979 | Okada et al. | 364/200 |
| 4,159,470 | 6/1979 | Strojny et al. | 340/147 SC |
| 4,186,380 | 1/1980 | Edwin et al. | 340/147 SC |
| 4,209,840 | 6/1980 | Berardi et al. | 364/200 |

Primary Examiner—David H. Malzahn
Attorney, Agent, or Firm—Marvin A. Naigur; John E. Wilson; John J. Herguth, Jr.

[57] ABSTRACT

A control system for controlling an industrial process includes a plurality of remotely located process control units (remotes) each coupled to an associated input/output device(s) and adapted to communicate with one another through a dual channel communications link. Each remote has a unique succession number within a predetermined succession order with supervisory communication-control of the communication link sequentially transferred to each remote according to its succession number to provide a revolving or master for the moment control of the system. Digital information in the form of data and control information blocks is transmitted between the remotes with the blocks transmitted twice on each channel of the communications link. The destination remote tests the block validity on one of the two dual channels and, if validated, responds with an acknowledgement signal (ACK) and, if invalid, tests the blocks on the other, alternate channel and then responds with an acknowledgement or non-acknowledgement signal (NAK) depending upon whether the data blocks tests on the alternate channel are found valid or invalid. A non-acknowledgement from the destination remote re-triggers the transmission of the blocks from the source remote. The system provides high overall operating efficiency since the remotes will maintain a system-like integrity on each side of a severed communication link and the redundant block transmission with alternate line checking provides very high information transfer reliability.

45 Claims, 20 Drawing Figures

FIG. 10A.

INITIAL

| | $R_0$ | $R_1$ | $R_2$ | $R_3$ | $R_4$ |
|---|---|---|---|---|---|
| TRANSFER SUCCESSION ORDER | MASTER | FIRST | SECOND | THIRD | FOURTH |
| RELATIVE SEQUENTIAL POSITION OF REMOTE FROM PRESENT MASTER | | | | | |
| TRANSFER MONITOR TIME-OUT (MICRO-SEC.) | | 50 | 100 | 150 | 200 |

FIG. 10B.

FIRST TRANSFER

| | $R_0$ | $R_1$ | $R_2$ | $R_3$ | $R_4$ |
|---|---|---|---|---|---|
| TRANSFER SUCCESSION ORDER | MASTER | FIRST | SECOND | THIRD | FOURTH |
| RELATIVE SEQUENTIAL POSITION OF REMOTE FROM PRESENT MASTER | | ⇑ | | | |
| TRANSFER MONITOR TIME-OUT (MICRO-SEC.) | | | 50 | 100 | 150 |

FIG. 10C.

SECOND TRANSFER

| | $R_0$ | $R_1$ | $R_2$ | $R_3$ | $R_4$ |
|---|---|---|---|---|---|
| TRANSFER SUCCESSION ORDER | FOURTH | MASTER | FIRST | SECOND | THIRD |
| RELATIVE SEQUENTIAL POSITION OF REMOTE FROM PRESENT MASTER | | | ⇑ | | |
| TRANSFER MONITOR TIME-OUT (MICRO-SEC.) | 150 | | | 50 | 100 |

| THIRD TRANSFER | TRANSFER SUCCESSION ORDER | $R_0$ | $R_1$ | $R_2$ | $R_3$ | $R_4$ |
|---|---|---|---|---|---|---|
| | | THIRD | FOURTH | MASTER | FIRST | SECOND |
| | RELATIVE SEQUENTIAL POSITION OF REMOTE FROM PRESENT MASTER | | | | ↑ | |
| | TRANSFER MONITOR TIME-OUT (MICRO-SEC.) | 100 | 150 | | | 50 |

FIG. 10D.

| FOURTH TRANSFER | TRANSFER SUCCESSION ORDER | $R_0$ | $R_1$ | $R_2$ | $R_3$ | $R_4$ |
|---|---|---|---|---|---|---|
| | | SECOND | THIRD | FOURTH | MASTER | FIRST |
| | RELATIVE SEQUENTIAL POSITION OF REMOTE FROM PRESENT MASTER | | | | | ↑ |
| | TRANSFER MONITOR TIME-OUT (MICRO-SEC.) | 50 | 100 | 150 | | |

FIG. 10E.

| FIFTH TRANSFER | TRANSFER SUCCESSION ORDER | $R_0$ | $R_1$ | $R_2$ | $R_3$ | $R_4$ |
|---|---|---|---|---|---|---|
| | | FIRST | SECOND | THIRD | FOURTH | MASTER |
| | RELATIVE SEQUENTIAL POSITION OF REMOTE FROM PRESENT MASTER | ← | | | | ⌐ |
| | TRANSFER MONITOR TIME-OUT (MICRO-SEC.) | | 50 | 100 | 150 | |

FIG. 10F.

INDUSTRIAL CONTROL SYSTEM WITH INTERCONNECTED REMOTELY LOCATED COMPUTER CONTROL UNITS

BACKGROUND OF THE INVENTION

The present invention relates to control systems of the type having a plurality of remotely located process control units connected together through a communications link and, more particularly, to a control system in which each of the remote units sequentially assumes supervisory communication control of the communication link and in which high reliability information transfer is achieved between remotes.

Many system type industrial installations, for example, those related to industrial process-type manufacturing and electrical power generation, employ a large number of physically distributed controlled-devices and associated sensors for effecting coordinated operation of the overall system. In the past, coordinated control of the various devices has been achieved by manual operation and various types of semi-automatic and automatic control systems including electro-magnetic relay systems, hardwired solid-state logic systems, and various types of computer control systems. The computer systems have included central systems in which the various sensors and controlled devices are connected to a central computer; distributed control systems in which a remotely located computer is connected to each of the controlled devices and to one another; and hybrid combinations of the central and distributed systems. The successful functioning of the control system is vital to any industrial process, and, accordingly, distributed systems have generally been preferred over central systems because the failure of one of the remotely located control computers generally does not cause a system wide failure as in the case of the failure of the central computer in the central system. However, in many distributed computer systems, one of the remotes or a specially designed control unit generally handles supervisory communication control of the communication buss and, for these systems, failure of the communication buss supervisor can lead to a system-wide failure.

In many industrial control systems, the various communication busses that extend between the remotely located computer process control units are exposed to high electrical noise environments. Accordingly, the information transferred over the communication buss can be subjected to error-inducing interference because of the harsh electrical environment. In view of this, a control system must have a means for detecting errors within the transmitted information in order to provide high reliability data transmission between remotes.

SUMMARY OF THE INVENTION

In view of the above, it is a broad overall object of the present invention, among others, to provide an industrial control system for controlling an industrial process or the like having a high overall system operating reliability.

It is also an object of the present invention to provide an industrial control system which may take the form of a distributed control system, a central control system, or a combination thereof to provide high overall operating efficiency and reliability.

It is another object of the present invention to provide an industrial control system defined by a plurality of remotely located process control units (remotes) interconnected through a communication buss which each of the remotely located units adapted assume supervisory control of the communication buss in accordance with a predetermined sequence.

It is still another object of the present invention to provide an industrial control system having a plurality of remotely located process control units interconnected through a buss in which high reliability information transfer is achieved between remotes.

In accordance with these objects, and others, the present invention provides a control system for controlling an industrial process including a plurality of remote process control units $R_n$ (remotes) connected to various controlled devices and sensors and communicating with one another through a communications link having at least two independent communication channels. Each remote is assigned a unique succession number or position in a predetermined succession order with each remote unit assuming supervisory communication control of the communications link on a revolving or master for the moment basis in accordance with the remote's relative position in the succession order. Information transfer including process data and command control information is accomplished between a source remote $R_s$ and a destination remote $R_d$ by successively transmitting two identical information blocks over each communication channel with the destination remote $R_d$ testing the validity of the blocks on one of the channels and, if valid, responding with an acknowledgement signal (ACK), and, if invalid, then testing the validity of the two blocks received on the other, alternate channel. An acknowledgement (ACK) or a non-acknowledgement signal (NAK) is sent by the destination remote $R_d$ if the information on the alternate channel is found, respectively, valid or invalid. The source remote $R_s$ will retransmit the information blocks in response to a non-acknowledgement signal from a destination remote with the retransmission from the source remote $R_s$ limited to a predetermined, finite number.

A control system in accordance with the present invention advantageously provides a means for controlling an industrial process in which high overall system operating reliability is achieved. The system is equally suitable for use with central (master/slave), distributed, and hybrid system configurations.

BRIEF DESCRIPTION OF THE DRAWINGS

The above description, as well as the objects, features, and advantages of the present invention will be more fully appreciated by reference to the following detailed description of a presently preferred but nonetheless illustrative embodiment in accordance with the present invention when taken in connection with the accompanying drawings wherein:

FIGS. 10A through 10F are exemplary tables illustrating the manner in which supervisory control of the communication link is transferred from remote to remote.

DESCRIPTION OF THE PREFERRED EMBODIMENT

Figure 1:
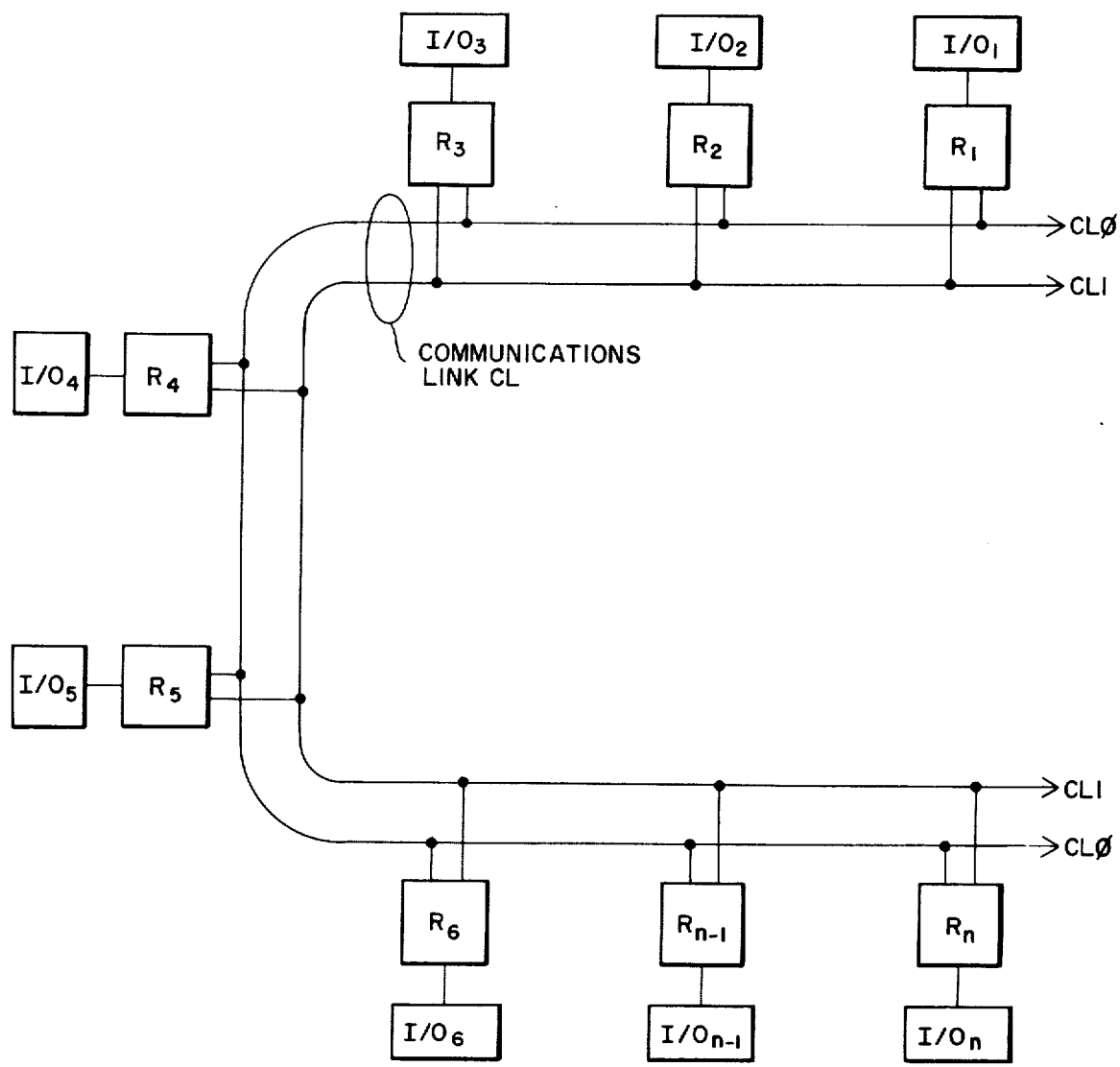
FIG. 1 is a schematic diagram of an exemplary process control system including a plurality of remote process control units (remotes) connected to a common, dual-channel communications link.

An industrial control system in accordance with the present invention is shown in schematic form in FIG. 1 and includes a communications link CL having a plurality of remote process control units (remotes) $R_1$, $R_2$, . . . $R_{n-1}$, $R_n$ connected thereto. The communications link CL is shown as an open line, double channel configuration formed from dual coax, dual twisted pair, or the like with the individual communication links identified, respectively, by the reference characters CL$\phi$ and CL1. While the system configuration shown in FIG. 1 is a distributed open loop or shared global bus type, the invention is equally suitable for application to central systems or central/distributed hybrid configurations. The system of FIG. 1 is adapted for use in controlling an industrial process, e.g., the operation of a power generating plant, with each remote unit $R_n$ connected to one or more associated or corresponding input/output devices $I/O_1$, $I/O_2$, . . . $I/O_{n-1}$, $I/O_n$ such as, but not limited to, various types of sensors (temperature, pressure, position, and motion sensors, etc.) and various types of controlled devices (motors, pumps, compressors, valves, solenoids, and relays, etc.).

Figure 2:
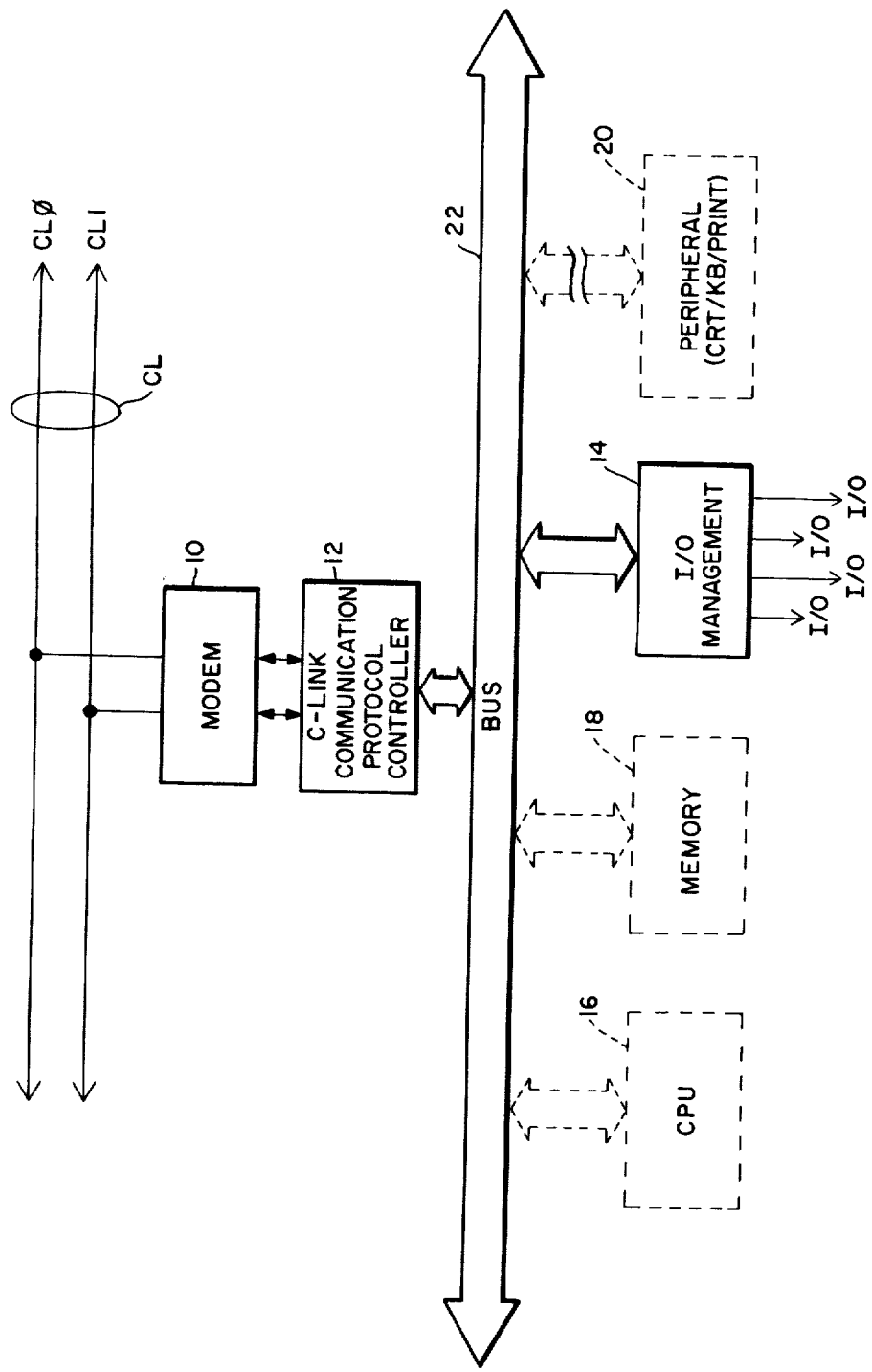
FIG. 2 is a schematic block diagram of an exemplary remote process control unit of the type shown in FIG. 1.

The architecture of an exemplary remote $R_n$ is shown in FIG. 2. While the architecture of the remote $R_n$ can vary depending upon the control process requirements, the remote shown in FIG. 2 includes a modem 10; a communication protocol controller 12; an input/output management device 14; a central processing unit (CPU) 16; a memory 18; a peripheral device 20 that can include e.g., a CRT display, a printer, or a keyboard; and a common bus 22 which provides addressing, control, and information transfer between the various devices which constitute the remote. The devices shown in dotted line illustration in FIG. 2 (that is, the central processing unit 16, the memory 18, and the peripheral device 20) are provided depending upon the process control requirements for the remote $R_n$. For example, in those remotes $R_n$ which function as an elemental wire replacer, only the modem 10, the communication protocol controller 12, and the input/output management 14 are provided. In more complex process control requirements, an appropriately programmed central processing unit 16 and appropriate memory 18 are provided to effect active control according to a resident firmware program. In still other remotes requiring a human interface, the appropriate peripheral devices(s) 20 may be connected to the common buss 22.

Figure 3:
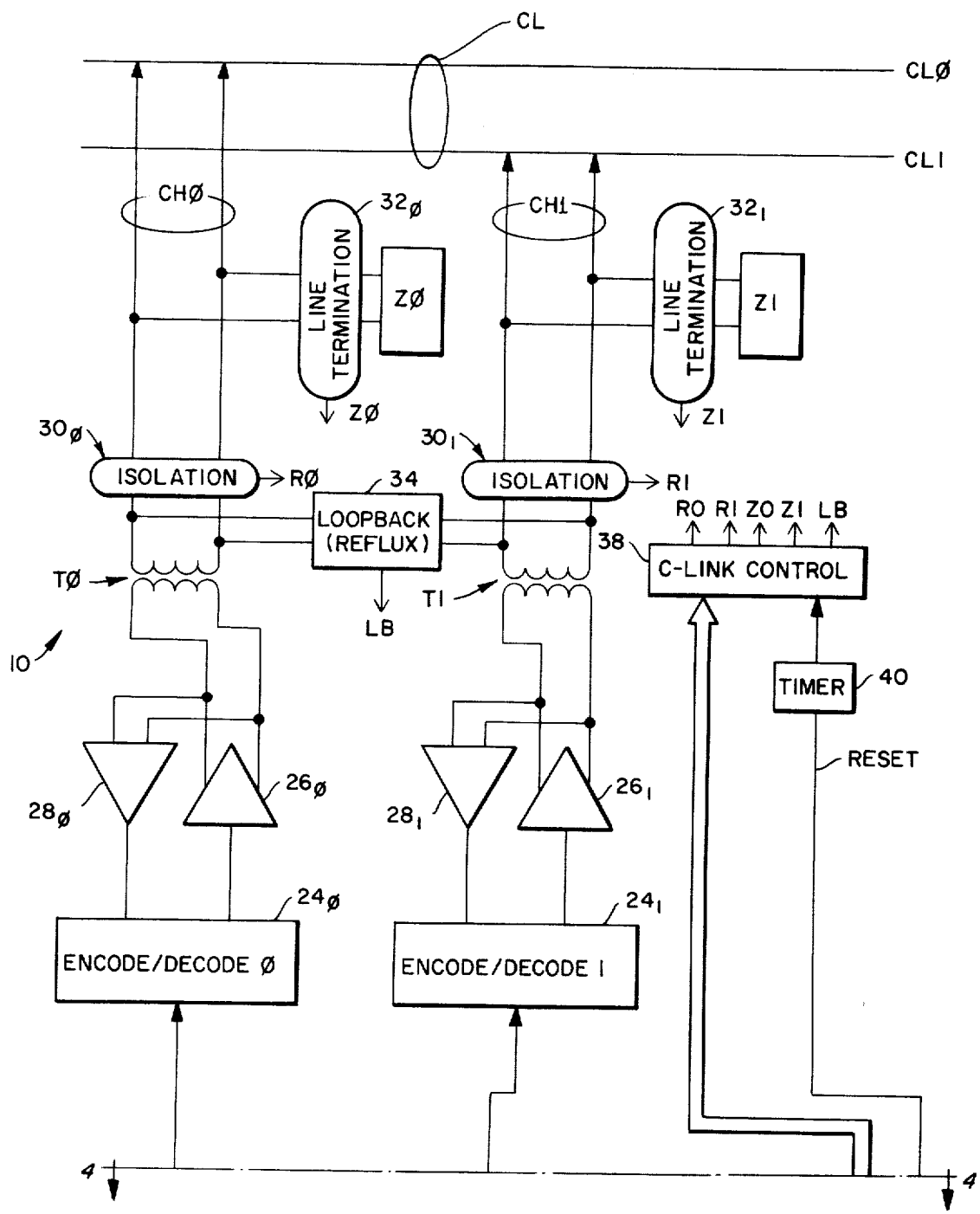
FIG. 3 is a schematic block diagram of an exemplary modulator/demodulator for the remote process control unit shown in FIG. 2.

As shown in more detail in FIG. 3, the modem 10 provides two independent communication channels CH$\phi$ and CH1 connected respectively to the communication links CL$\phi$ and CL1. Each of the communication channels CH$\phi$ and CH1 is provided with substantially identical communication devices, and a description of the communication devices of the first communication channel CH$\phi$ is sufficient to provide an understanding of the second communication channel CH1. The communication channel CH$\phi$ includes an encoder/decoder $24_\phi$ for providing appropriate modulation and demodulation of the digital data transmitted to and received from the communication link CL$\phi$. In the preferred form, the encoder/decoder $24_\phi$ converts digital information in non-return-to-zero binary (NRZ) format to base-band modulation (BBM) signal format for transmission and effects the converse for reception. Amplifiers $26_\phi$ and $28_\phi$ are provided, respectively, to drive a passive coupling transformer T$\phi$ with digital information provided from the encoder/decoder $24_\phi$ and provide amplified signals to the encoder/decoder $24_\phi$ from the coupling transformer T$\phi$. A set of selectively operably relay contacts $30_\phi$ are provided between the coupling transformer T$\phi$ and the corresponding communication link CL$\phi$ to effect selective interruption thereof to isolate the remote $R_n$ from the communications link CL, and another set of relay contacts $32_\phi$ are provided to selectively connect the signal output of the coupling transformer T$\phi$ with a termination impedance Z$\phi$. The termination impedance Z$\phi$ is used when the particular remote $R_n$ is at the end of the communication link CL to provide proper line termination impedance for the link. A selectively operable loop back circuit 34 is provided to permit looping back or re-circulation of test data during diagionistic checking of the remote $R_n$. The isolation relays $30_\phi$ and $31_1$, the impedence termination relays $32_\phi$ and $32_1$, and the loop back circuit 34 are connected to and selectively controlled by a C-link control device 38 which receives its communication and control signals from the communication protocol controller 12 described more fully below. A watch-dog timer 40 is provided to cause the C-link control device 38 to operate the isolation relays $30_\phi$ and $30_1$, to disconnect the remote $R_n$ from the communication link CL in the event the timer 40 times-out. The timer 40 is normally prevented from timing out by periodic reset signals provided from the communication protocol controller 12. In this way, a remote $R_n$ is automatically disconnected from the communication link CL in the event of a failure of the communication protocol controller 12.

Figure 4:
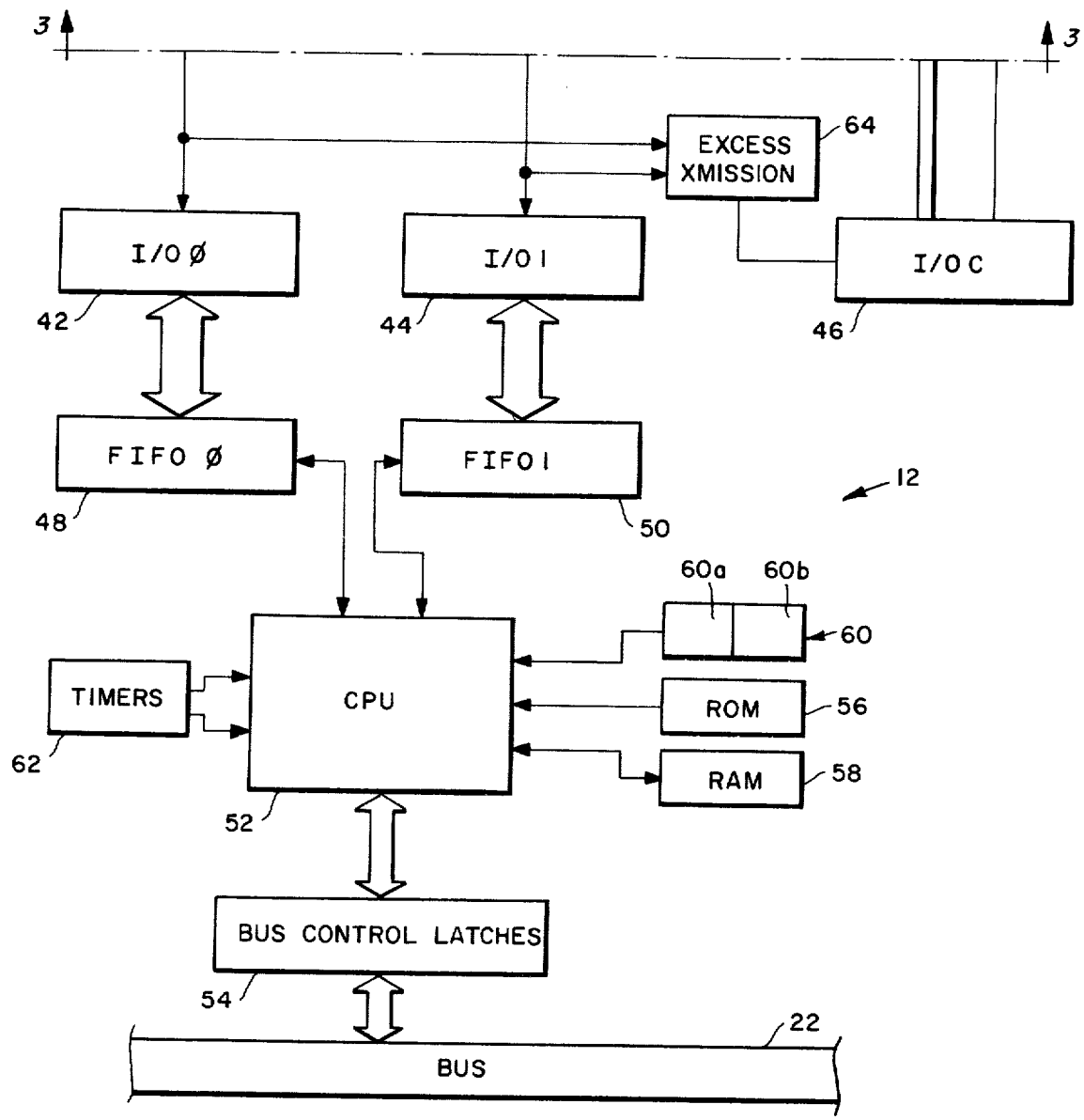
FIG. 4 is a schematic block diagram of an exemplary communication protocol controller for the remote process unit shown in FIG. 2.

As shown in more detail in FIG. 4, each communication protocol controller 12 includes input/output ports 42, 44, and 46 which interface with the above described modem 10 for the communication channels CH$\phi$ and CH1 and the modem C-link control device 38 (FIG. 3). A first-in first-out (FIFO) serializer 48 and another first-in first-out serializer 50 are connected between the input/output ports 42 and 44 and a CPU signal processor 52. The first-in first-out serializers 48 and 50 function as temporary stores for storing information blocks provided to and from the modems 10 as described more fully below. The CPU 52, in turn, interfaces with the bus 22 through bus control latches 54. A read only memory (ROM) 56 containing a resident firmware program for the CPU and a random access memory (RAM) 58 are provided to permit the CPU to effect its communication protocol function as described more fully below. A register 60 (for example, a manually operable DIP switch register or a hardwired jumper-type register) that includes registers 60a and 60b and timers 62 are also provided to assist the CPU in performing its communication protocol operation. An excess transmission detector 64, connected to input/output ports 42 and 44 (corresponding to communication chanels CH$\phi$ and CH1) determines when the transmission period is in excess of a predetermined limit to cause the C-link control device 38 (FIG. 3) to disconnect the transmitting remote from the communications link CL and thereby prevent a remote that is trapped in a transmission mode from monopolizing the communications link CL.

The input/output management device 14, a detailed description of which is not necessary to an understanding of the present invention, is preferably a firmware controlled microprocessor-based device which is adapted to scan the various input/output hardware points, effect data collection and distribution to and from the input/output points, format the collected data in preferred formats, and assemble the data in selected sequences as well as place data in memory for subsequent transmission.

As mentioned above, one or more remotes $R_n$ may be provided with active processing capability by interfacing a central processing unit 16 and corresponding memory 18 with the remote bus 22. For example, in those remotes $R_n$ that monitor and control a specific operating characteristic of a process step, such as a temperature or pressure variable, a microprocessor 16 with an appropriate firmware program(s) can be provided to measure the actual operating characteristic, effect a comparison between the actual operating characteristic and the preferred set point, and effect one or more input/output actions in accordance with predetermined process control algorithms.

In the preferred embodiment, the signal processor for the CPU signal processor 52 is a 8X300 micro-controller manufactured by the Signetics Company of Sunnyvale, Calif., and the central processing unit 16, when used, is an 86/12 signal board 16-bit micro-computer manufactured by the Intel Company and adapted to and configured for the Intel MULTIBUS.

Figure 5:
FIG. 5 illustrates the format of an exemplary or illustrative information block for transferring information between remotes.

Each remote $R_n$ is adapted to communicate with the other by transmitting digital data organized in predetermined block formats. A suitable and illustrative block format 66 is shown in FIG. 5 and includes a multi-word header frame 66A, a multi-word data frame 66B, and a block termination frame or word 66C. Selected of the information block configurations are adapted to transfer process control information to and from selected remote units $R_n$ and other of the block configurations are adapted to transfer supervisory control of the communications link CL from one remote to the other remote as explained in greater detail below.

Figure 5A:
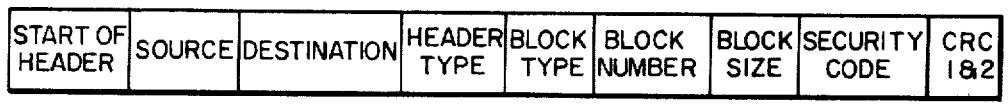
FIG. 5A illustrates the format of a header frame of the information block shown in FIG. 5.
Figure 5B:
FIG. 5B illustrates the format for a data/information frame of the information block shown in FIG. 5.
Figure 5C:
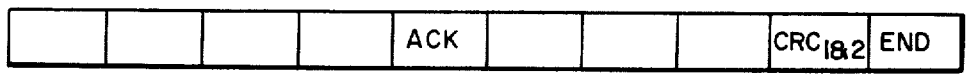
FIG. 5C illustrates the format for an acknowledgement block (ACK) for acknowledging successful receipt of an information block.
Figure 5D:
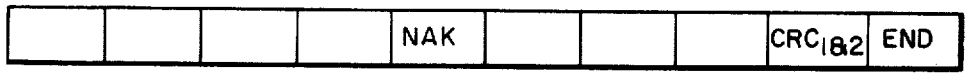
FIG. 5D illustrates the format for a non-acknowledgement block (NAK) for indicating the unsuccessful transmission of an information block between remotes.

An exemplary format for the header and data frames of an information block 66 is shown, respectively, in FIGS. 5A and 5B. The header frame 66A preferably includes a 'start of header' word(s) that indicates to all remotes that information is being transmitted; a 'source' identification word(s) that indicates identity of the source remote $R_s$ that is transferring the information; a 'destination' word(s) that indicates the identity of receiving or destination remote $R_d$; a 'header-type' word(s) that indicates whether the data block is transmitting data, a parametered command block, or a parameterless command block; 'block-type' word indicating the type of block (that is, a command block or a data block); a 'block number' word that indicates the number of blocks being sent; a 'block size' word indicating the length of the data frame; a 'security code' word(s) that permits alternation of the resident software programming in a remote; and, finally, a two-byte 'cyclic redundancy code' (CRC) validity word. The data frame for each data block, as shown in FIG. 5B, can include a plurality of data carrying bytes or words $B_1$, $B_2$, ... $B_n$ of variable length terminated with a two-byte cyclic redundancy code word. As described more fully below, each of the remotes is adapted to acknowledge (ACK) successful receipt of data and command blocks and non-acknowledge (NAK) the receipt of data in which a transmission error is detected. When transmitting an acknowledgement block or a non-acknowledgement block, the header format used is shown in FIGS. 5C and 5D in which an acknowledgement (ACK) or non-acknowledgement (NAK) word occupies the 'block type' word position. The block formats disclosed above are intended to be illustrative only and not limiting.

The various remote units $R_1$, $R_2$, $R_3$, ... $R_n$ communicate with one another by having each remote successively take control of the communications link CL and then passing digital information between the controlling source remote $R_s$ and a destination remote $R_d$ using a double transmission alternate line technique that provides for high reliability data transfer between remotes even when one of the two communication links CL$\phi$ or CL1 is inoperative, for example, when one of the two communication cables is severed as occassionally occurs in harsh industrial environments.

When a remote unit assumes control of the communication link CL (as explained more fully below) and, as a source remote $R_s$, desires to send data blocks to another, destination remote $R_d$, the data block is assembled at the source remote $R_s$ in accordance with the block formats discussed above in connection with FIGS. 5-5D and transmitted through the information channels CL$\phi$ and CL1 of the source remote $R_s$ to the communication links CL$\phi$ and CL1 with the header frame containing both the source remote $R_s$ and the destination remote $R_d$ identification information.

Figure 6:
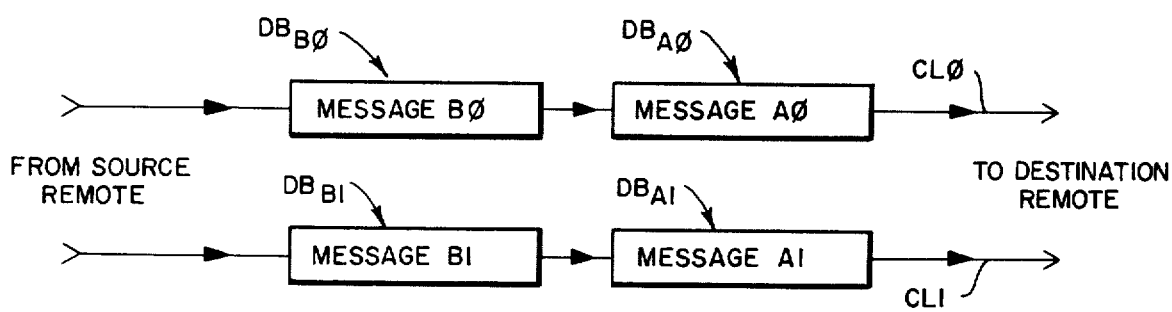
FIG. 6 illustrates, in pictorial form, two identical data blocks having the format shown in FIG. 5 successively transmitted on each communication channel of the communication link illustrated in FIG. 1.

In accordance with the data transmission technique, the communication protocol controller 12 of the source remote $R_s$ transmits the information blocks twice on each communication link CL$\phi$ and CL1 as schematically illustrated in FIG. 6 to provide a first data block $DB_A$ and then a second, following data block $DB_B$ on each communication link CL$\phi$ and CL1. The transmitted information block headers include the identity of the destination remote, $R_d$, which causes the destination remote $R_d$ to receive and act upon the information blocks. At the destination remote $R_d$, the two data blocks $DB_{A\phi}$ and $DB_{B\phi}$ on the communication link $CL\phi$ are passed through the communication channel $CH\phi$ and the two data blocks $DB_{A1}$ and $DB_{B1}$ on the communication link CL1 are passed through the communication channel CH1 to, respectively, the first-in first-out serializers 48 and to (FIG. 4).

Figure 7:
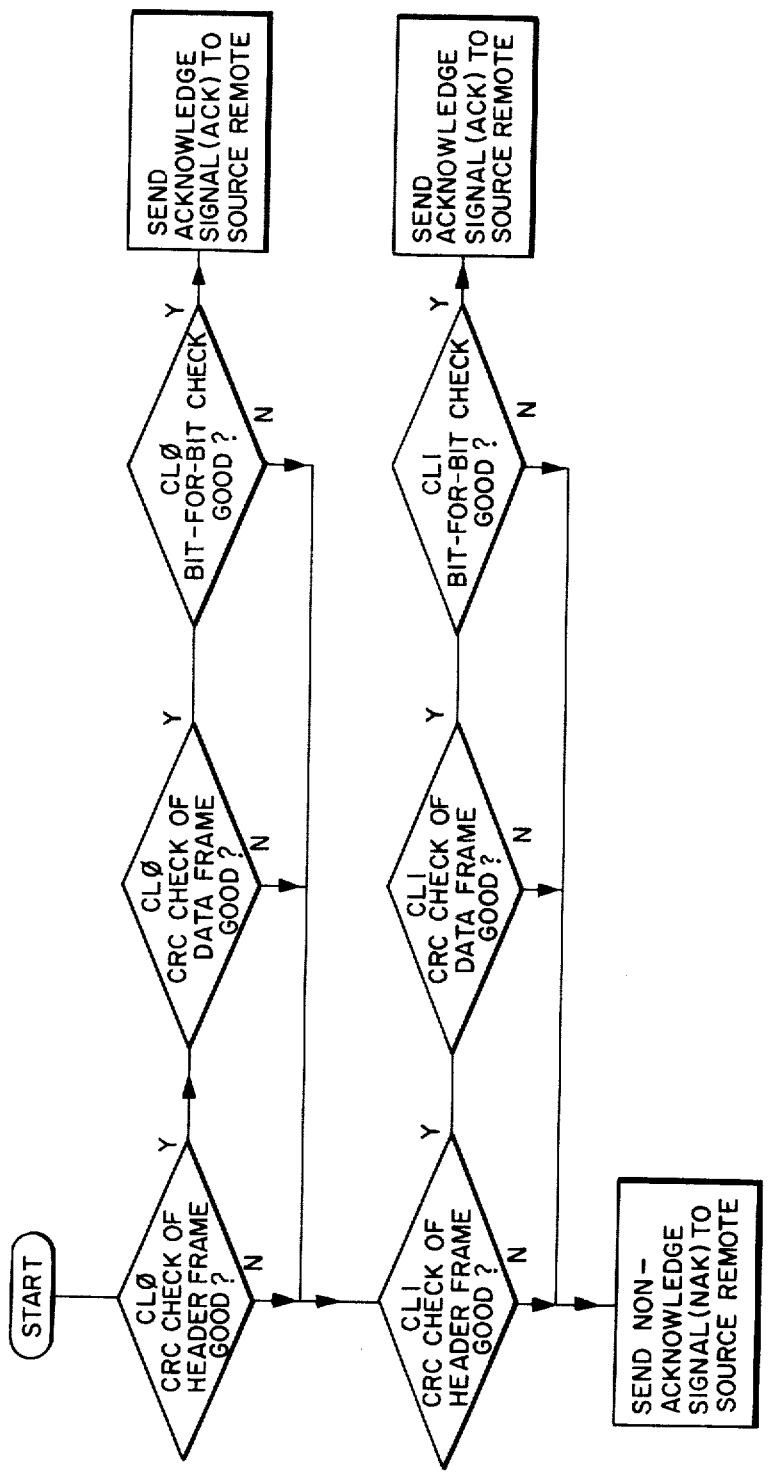
FIG. 7 is a flow diagram summary of the manner in which a source and a destination remote effect communications with one another.

As shown in the summary flow diagram of FIG. 7, the destination remote $R_d$ checks the validity of the received data by selecting one of the two communication links (e.g. $CL\phi$ in FIG. 7) and then checks the first data block on the selected line (that is, $DB_{A\phi}$) by performing a cyclic redundancy check of the header frame and, if valid, performing a cyclic redundancy check of the data frame. If the data frame is valid, the communication protocol controller 12 of the destination remote $R_d$ then performs a bit-for-bit comparison between the CRC-valid first data block $DB_{B\phi}$ and the second data block $DB_{A\phi}$. If the bit-for-bit comparison is good, an acknowledgement (ACK) signal is sent from the destination remote $R_d$ to the source remote $R_s$ to indicate the receipt of valid information and complete that data block information transaction. On the other hand, if the CRC validity checks of the header or the data frame or the bit-for-bit comparison check indicate invalid data, the protocol controller 12 of the destination remote $R_d$ then selects the other, alternate line (in this case, CL1) and performs the aforementioned cyclic redundancy checks of the header and data frame and the bit-for-bit comparison between the first and second data blocks $DB_{A1}$ and $DB_{B1}$ on the alternate line CL1. If these checks indicate valid data on the alternate line, the destination remote responds with an acknowledgement signal to conclude the data block transmission transaction. On the other hand, if these checks indicate invalid data on the alternate line (which means that the data blocks on both the first-selected line and the alternate line are invalid) the destination remote $R_d$ responds with a non-acknowledgement signal (NAK) to cause retransmission of the data blocks from the source remote $R_s$. The non-acknowledgement block (NAK) includes a byte or bytes indicating the identity of the data block or blocks which should be retransmitted. A counter (not shown) is provided that counts the number of retransmissions from the source remote $R_s$ and, after a finite number of retransmissions (e.g. four), halts further retransmission to assure that a source remote $R_s$ and a destination remote $R_d$ do not become lost in a repetitive transmit/NAK/retransmit/NAK . . . sequence in the event of a hardware or software failure of the destination remote $R_d$ error checking mechanism.

Figure 8A:
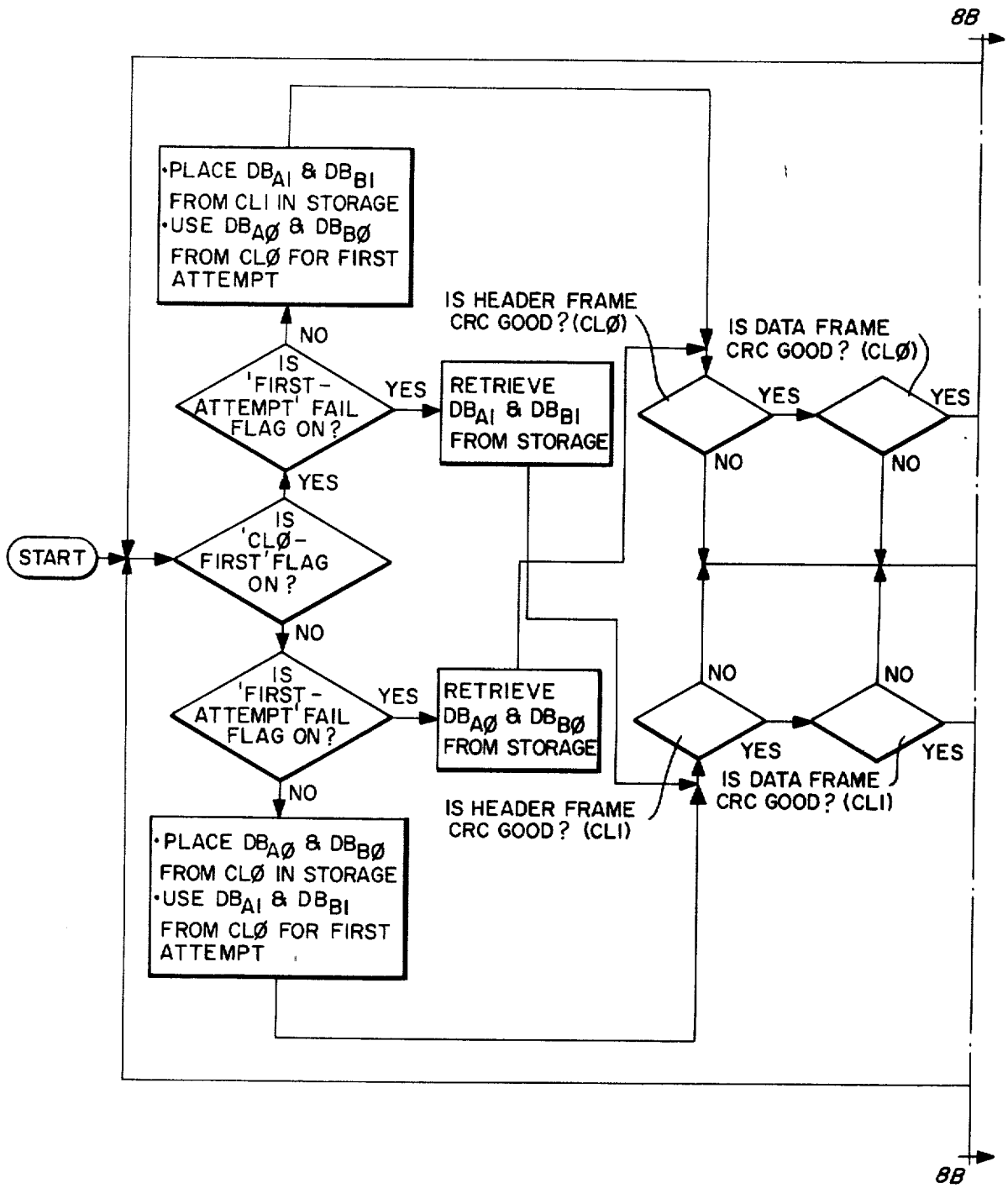
FIG. 8A is a partial flow diagram illustrating in detail the manner in which a source and a destination remote communicate and validate information transferred between one another.
Figure 8B:
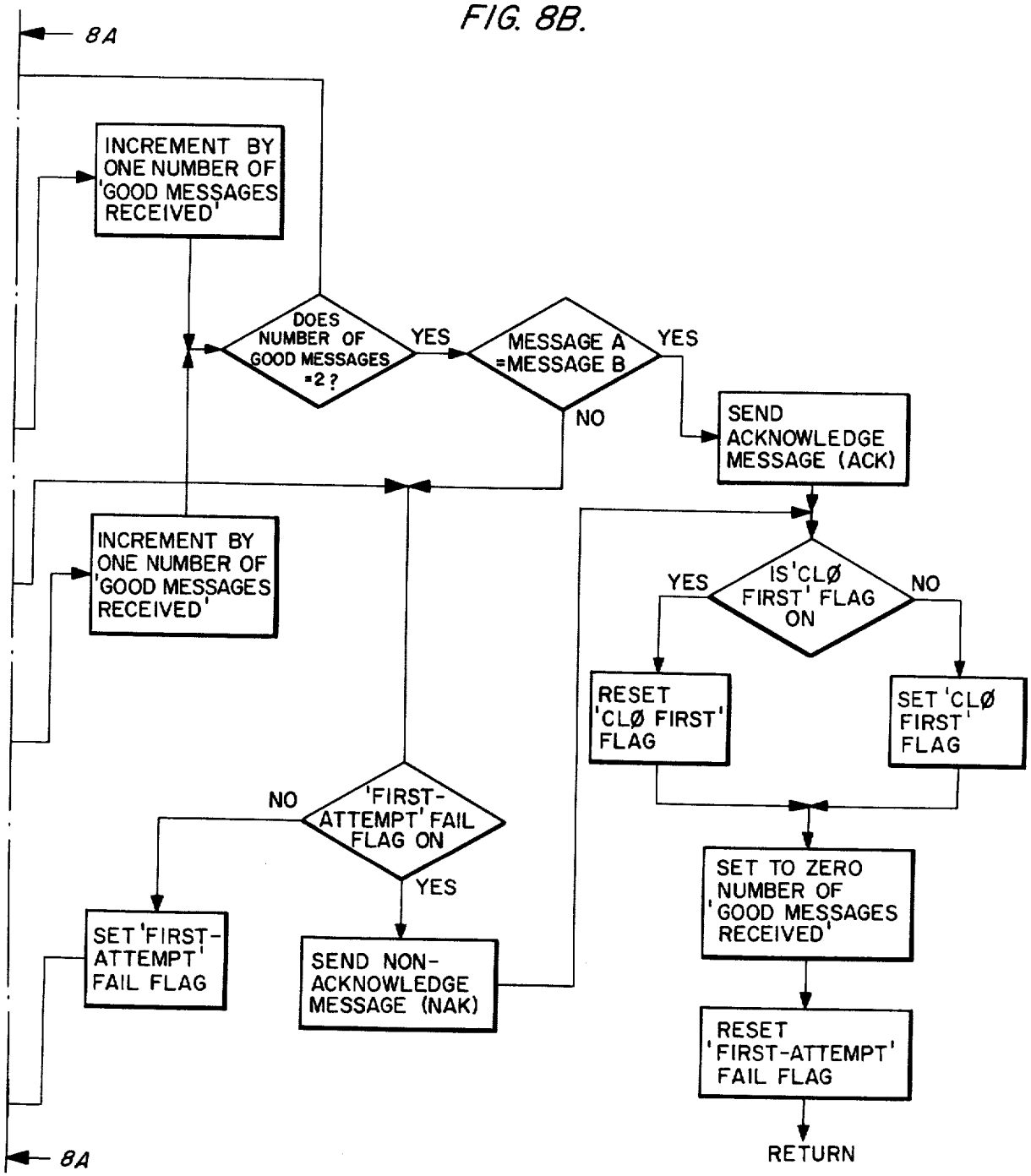
FIG. 8B is a partial flow diagram which completes the flow diagram of FIG. 8A and illustrates in detail the manner in which a source and a destination remote communicate and validate information transferred between one another.
Figure 9:
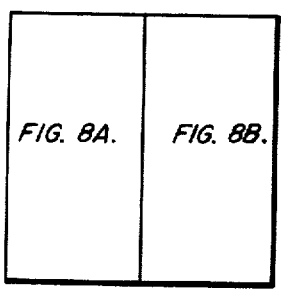
FIG. 9 is a legend illustrating the manner in the flow diagrams of FIG. 8A and FIG. 8B are to be read.

The double message alternate line checking sequence summarized in FIG. 7 may be more fully appreciated by referring to the detail flow diagram shown in FIGS. 8A and 8B (as read in accordance with the flow diagram map of FIG. 9). At the start of the information validity checking procedure, the 'line $\phi$-first' flag register is checked; if a flag is present the 'first-attempt fail' flag register is checked, and if there is no flag in this register, the two data blocks $DB_{A1}$ and $DB_{B1}$ on channel CH1 are stored while the two data blocks $DB_{A\phi}$ and $DB_{B\phi}$ on channel $CH\phi$ are used for the first attempt information check. Thereafter, the header frame of the first data block $DB_{A\phi}$ on channel $CH\phi$ undergoes a CRC check and, if acceptable, the data frame of this data block $DB_{A\phi}$ undergoes a CRC check. If the header and data frames CRC checks indicate valid data a 'good message' register is incremented. If the number of good messages is less than two, the error checking procedure returns to the initial part of the flow diagram and, after determining there is no channel $CH\phi$ first flag or first-attempt flag present, checks the second, following data block $DB_{B\phi}$ by repeating the header and data CRC cyclic redundancy checks. If the header and data frames pass the CRC checks, the 'good message' register is incremented again to indicate that a total of two messages in succession (that is, $DB_{A\phi}$ and $DB_{\phi}$) have passed the cyclic redundancy check for the header and data frames. Thereafter the two data blocks $DB_{A\phi}$ and $DB_{B\phi}$ received on line $\phi$ are checked by performing a bit-by-bit comparison between the two. If the data blocks $DB_{A\phi}$ and $DB_{B\phi}$ pass the bit-by-bit comparison test, the communications protocol controller 12 of the destination remote $R_d$ sends an acknowledgement (ACK) message to the source remote $R_s$ to conclude the information block transfer and resets the various registers. If, on the other hand, either the data block $DB_{A\phi}$ or $DB_{B\phi}$ on line $\phi$ fail the header and data frame CRC checks or these two data blocks fail the bit-by-bit comparison check, the communication protocol controller 12 sets the 'first-attempt fail' flag and returns to the start of the procedure to determine that the 'line $\phi$-first' flag and the 'first-attempt' fail flag are present. The communication protocol controller 12 then uses the stored data blocks $DB_{A1}$ and $DB_{B1}$ from line 1 (which data blocks were previously stored in FIFO 50). The header block and data block of the data blocks $DB_{A1}$ and $DB_{B1}$ from line CL1 undergo the CRC check and, if successful, cause the incrementing of the 'good message received' register to cause the communication protocol controller 12 to then check the validity of the second data block $DB_{B1}$. If the data blocks $DB_{A1}$ and $DB_{B1}$ pass the CRC checks, they are compared with one another in a bit-by-bit comparison test and if this comparison check is successful, an acknowledgement (ACK) is sent. If on the other hand, either data block $DB_{A1}$ or $DB_{B1}$ does not pass the CRC check or the data blocks do not pass the bit-for-bit comparison test, a non-acknowledgement (NAK) signal is sent to the source remote $R_s$ including information requesting the retransmission of the data blocks which failed the validity test at the destination remote $R_d$. The source remote $R_s$ then retransmits the improperly received information blocks as described above with retransmission limited to a finite number. A register is provided for each of the communication links for recording, in a cumulative manner, the number of times a invalid message is received for each communication link. In this manner, it can be determined, on a statistical basis, whether one of the two communication links has suffered a deterioration in signal transmission capability and, of course, whether one of the communication links is severed.

As can be appreciated, the dual transmission of the identical messages on plural communication links vastly enhances the ability of the destination remote $R_d$ to detect errors and determine whether the information being transmitted is valid or not. In addition, the destination remote $R_d$ is able to operate and successfully receive messages even if one of the communication links is severed since the communication protocol controller 12 at the destination remote $R_d$ will examine the received signals on each line and will find invalid data on the severed line but will always examine the data blocks on the other line and, if necessary, request retransmission of the information blocks.

In selecting one of the two channels CH$\phi$ or CH1 for the first validity check, it is preferred that one of the two channels (e.g. CH$\phi$) can be selected for the first check on every other information transaction and that the other of the two channels (e.g. CH1) be selected for the first check for the other information transactions. While the system has been disclosed as having dual communication links CL$\phi$ and CL1, the invention is not so limited and can encompass more than two communication links with the remotes adapted to sequentially examine signals received on the various channels.

As mentioned above, each remote $R_n$ of the control system is adapted to accept and then relinquish supervisory control of the communication link CL on a master for the moment or revolving master arrangement. The communication protocol controller 12 of each remote $R_n$ includes a register which contains the remote succession number, another register which contains the total number of remotes in the system, and another register which contains the relative position of the remote from the present system master. The first two registers are schematically illustrated by the reference character 62 in FIG. 4. In addition, each remote $R_n$ includes a variable transfer-monitor timer the time-out interval of which is set in accordance with a predetermined control-transfer time constant (50 micro-seconds in the preferred embodiment) and the position of the particular remote relative to the present system master to permit, as explained in more detail below, the master for the moment transfer to continue even in the event of a disabled remote (that is, a remote that is unable to accept supervisory control because of a malfunction). Another timer is provided to force transfer of supervisory control of the communications link CL in the event a remote, because of a malfunction, is unable to transfer supervisory control to its next successive remote. The operation of the master for the moment transfer technique can be appreciated by consideration of the following example of an illustrative system that includes five remotes arranged in the open loop configuration of FIG. 1 and transferring supervisory control of the communications link CL in accordance with the tables of FIGS. 10A–10F. The upper row of each table indicates the succession sequence or order of the five remotes $R_0$, $R_1$, $R_2$, $R_3$, and $R_4$ that comprise the system; the intermediate row identifies the remote that is the present master for the moment and also identifies the relative successive position of the other remotes from the present master, that is, the first (or next) successive remote from the present master, the second successive remote from the present master, the third remote from the present master, etc.; and the third row of each table lists the setting of the variable transfer-monitor timer for the particular remote.

The system is provided with initialization software so that the first remote in the succession $R_0$ assumes supervisory control of the communication link CL after system start-up and becomes the initial master of the system (FIG. 10A). When the initial master $R_0$ is in control of the communications link CL, it can send data to any of the other remotes, request status or other data from another remote, and send control blocks and the like over the communications link. When the master $R_0$ determines that it no longer desires possession of the communications link CL, it passes supervisory control of the communication link CL, to the next or first successive remote in accordance with the succession order. Thus, when the present master $R_0$ concludes its information transfer transactions, it transfers supervisory control of the communications link CL to its next or first successive remote $R_1$ by transmitting a control block to the remote $R_1$ with all the remaining remotes (that is, $R_2$, $R_3$, $R_4$) being cognizant of the transfer of supervisory control from the present master $R_0$ to its first or next successive remote $R_1$. Since, in the present system, the transfer of supervisory control of the communications link CL is expected to take place within 50 micro-seconds, the second successive remote $R_2$, as shown in the third row of the table of FIG. 10B, sets its variable transfer-monitor timer to 50 micro-seconds, the third successive remote $R_3$ sets its variable transfer-monitor timer to 100 micro-seconds, and the fourth successive remote $R_4$ sets its transfer-monitor timer to 150 micro-seconds. When the first successive remote $R_1$ receives the control block from the present master $R_0$, it accepts supervisory control of the communications link CL by responding with an acknowledgement message (ACK). If the control block is mis-recieved, the first successive remote $R_1$ can respond with an non-acknowledgement (NAK) to request retransmission of the control block transferring supervisory control of the communications link CL. During the time interval that the present master remote $R_0$ is attempting to transfer supervisory control of the communication link CL to its next successive remote $R_1$, the transfer-monitor timers of the remaining remotes are counting down. If, for any reason, the next or first successive remote $R_1$ fails to take control (e.g. a malfunction of the remote), the transfer-monitor timer of the second successive remote $R_2$ will time-out at 50 micro-seconds and cause the second successive remote $R_2$ to then accept supervisory control of the communication link CL from the present master $R_0$ and thus bypass an apparently malfunctioning first successive remote $R_1$.

Assuming that the initial system master $R_0$ successively transfers supervisory control of the communications link CL to its first successive remote $R_1$, that successive remote $R_1$ then becomes the present master with the remaining remotes changing their position relative to the present master and setting their transfer-monitor timers in accordance with the second and third rows of the table of FIG. 10B. When the present master $R_1$ concludes its information transfer transactions, if any, it attempts to transfer supervisory control to its first or next successive remote $R_2$ by sending an appropriate control block to remote $R_2$ which responds with an acknowledgement signal (ACK) or, in the event of a mistransmission of the control block, a non-acknowledgement signal (NAK) which causes retransmission of the control block. When the control block requesting transfer of supervisory control of the communication link CL is sent from the present master $R_1$ to its next successive remote $R_2$, all the remaining remotes reset their transfer-monitor timers in accordance with their position relative to the present remote as shown in the third row of table of FIG. 10C. Should the next successive remote $R_2$ be unable to accept supervisory control of the communication link CL from the present master $R_1$, the transfer-monitor timer of the second successive remote $R_3$ will time-out in 50 micro-seconds and cause the second successive remote $R_3$ to assume supervisory control of the communications link CL to thereby bypass an apparently malfunctioning first successive remote $R_2$. As can be appreciated from a review of the transfer-monitor time-out settings of the various remotes, supervisory control of the communications link CL will transfer even if one or more successive remotes are malfunctioning, when the transfer-monitor timer of the next operable remote times out. This transfer sequence continues in succession as shown in the remaining tables of FIGS. 10D to 10F with supervisory control of the communication link CL being passed from remote to remote in succession with the last remote $R_4$ returning supervisory control to the first remote $R_0$.

By employing a master for the moment transfer technique in which the receiving remote acknowledges control from the transferring remote and in which retransmission of a mis-received control block is provided for in response to a non-acknowledgement signal from the receiving remote, it is possible to positively transfer supervisory control of the communication link. This technique advantageously transfers control using the data and information carrying communication link rather than as, in other systems, by providing separate communication lines or channels dedicated solely by supervisory control transfer functions. Also the provision of a variable transfer-monitor timer at each remote that is set in accordance with the remote's relative position to the present master and a transfer time-constant automatically transfers supervisory control of the communications link even if one or more of the successive remotes are malfunctioning.

As will be apparent to those skilled in the art, various changes and modifications may be made to the industrial control system of the present invention without departing from the spirit and scope of the invention as recited in the appended claims and their legal equivalent.

What is claimed is:

1. An information transfer system for transmitting digital information between active devices and testing the validity of the transmitted information, said system comprising:
   at least one active device for transmitting information in digital form;
   at least one other active device for receiving information in digital form;
   plural independent communication channels connected to and extending between said first-mentioned and said second-mentioned active devices for conveying information therebetween;
   said first-mentioned active device including a transmission means for transmitting digital information arranged in blocks of predetermined format, said transmission means transmitting an identical block on each of said plural communication channels; and
   said second-mentioned active device including receiving means for receiving digital information transmitted by said first-mentioned active device and for selecting one of said plural communication channels and testing the validity of the received block and, when said received block from said first-selected communication channel is found invalid, for selecting another of said plural communication channels and testing the validity of the received block on said other communication channel.

2. The information transfer system claimed in claim 1 wherein:
   said second-mentioned active device includes responding means for transmitting an acknowledgement signal over at least one of said channels to said first-mentioned active device when the block received over said first-selected communication channel is valid, for transmitting over at least one of said channels an acknowledgement signal to said first-mentioned active device when the block received over said other selected communication channel is found valid, and for transmitting over at least one of said channels a non-acknowledgement signal to said first-mentioned active device when the block received over said other selected communication is found invalid.

3. The information transfer system claimed in claim 2 wherein
   said transmission means is responsive to the non-acknowledgement signal from said second-mentioned active device to retransmit the invalidly received block.

4. The information transfer system claimed in claim 3 including means to limit the number of retransmissions of an invalidly received block to a predetermined value.

5. The information transfer system claimed in claim 1 wherein
   said transmission means is operable to transmit said block at least twice in succession on each communication channel.

6. The information transfer system claimed in claim 5 wherein:
   said receiving means includes means to test the validity of the plural blocks received on a communications channel by effecting a comparison between the first-received and the second-received block.

7. The information transfer system claimed in claim 1 further comprising:
   memory means for storing the block received by said receiving means on said other communication channel while the block received on said first-selected communication channel is tested for validity.

8. An information transfer system for transferring digital information between stored-program controlled means and for testing the validity of the transferred information, said system comprising:
   at least one stored-program controlled means for transmitting digital information in blocks of predetermined format which blocks include an error detecting code word;
   at least one other stored-program controlled means for receiving digital information in said block format and adapted to test the validity of said received block using the error detecting code word;
   plural independent communication channels connected to and extending between said first-mentioned and said second-mentioned stored-program controlled means for transferring information blocks therebetween; and
   said second-mentioned stored-program controlled means having validity testing means for selecting a one of said plural communication channels and testing the validity of the block received thereon and for selecting another of said plural communication channels and testing the validity of the block received on said other communication channel when the block received on said first-selected communication channel fails its validity test.

9. The information transfer system claimed in claim 8 wherein said second-mentioned stored-program controlled means includes responding means for transmitting over at least one of said channels an acknowledgement signal to said first-mentioned stored-program controlled means when the block received over said first-selected communication channel is valid, for transmitting over at least one of said channels an acknowledgement signal to said first-mentioned stored-program controlled means when the block received over said other selected communication channel is found valid, and for transmitting over at least one of said channels a non-acknowledgement signal to said first-mentioned stored-program controlled means when the block received over said other selected communication channel is found invalid.

10. The information transfer system claimed in claim 9 wherein
said first-mentioned stored-program controlled means is responsive to the non-acknowledgement signal from said second-mentioned stored-program controlled means to retransmit the invalidly received block.

11. The information transfer system claimed in claim 10 including means to limit the number of retransmissions of an invalidity received block to a predetermined value.

12. The information transfer system claimed in claim 8 wherein
said first-mentioned stored-program controlled means is operable to transmit said block at least twice in succession on each communication channel.

13. The information transfer system claimed in claim 12 wherein:
said second-mentioned stored-program controlled means includes means to test the validity of the plural blocks received on a communications channel by effecting a comparison between the first-received and the second-received block on the channel.

14. The information transfer system claimed in claim 8 further comprising:
memory means for storing the block received on said other communication channel by said second-mentioned stored-program controlled means while the block received on said first-selected communication channel is tested for validity.

15. A system for controlling an industrial process, said system including a plurality of process controlling remotes each connected by a common communications link, said system comprising:
at least one process controlling remote for transmitting process control information in digital form, said information arranged in groups of predetermined format with each of said information groups including an error detecting code word;
at least one other process controlling remote for receiving process control information in said information group format and testing the validity of the received blocks based on said error detecting code;
the communication link interconnecting said first-mentioned and said second-mentioned remotes including at least two independent communication channels, said first-mentioned remote transmitting an identical information group on each of said communication channels, said second-mentioned remote operable to select a one of said communication channels and evaluate the validity of said received information group and select the other of said communication channels when the received information group on said first-selected communication channel fails its validity test.

16. The industrial process control system claimed in claim 15 wherein
said second-mentioned remote includes responding means for transmitting over said communications link an acknowledgement signal to said first-mentioned remote when the information group received over said first-selected communication channel is valid, for transmitting over said communications link an acknowledgement signal to said first-mentioned remote when the information group received over said other selected communication channel is found valid, and for transmitting over said communications link a non-acknowledgement signal to said first-mentioned remote when the information group received over said other selected communication channel is found invalid.

17. The industrial process control system claimed in claim 16 wherein
said first-mentioned remote is responsive to the non-acknowledgement signal from said second-mentioned remote to said first-mentioned remote to retransmit the invalidly received information group.

18. The industrial process control system claimed in claim 16 including means to limit the number of retransmissions of an invalidly received information group to a predetermined value.

19. The industrial process control system claimed in claim 15 wherein
said first-mentioned remote is operable to transmit said information groups at least twice in succession on each communication channel.

20. The industrial process control system claimed in claim 19 wherein:
said second-mentioned remote includes means to test the validity of the plural information groups received on a communications channel by effecting a comparison between the first-received and the second-received information group on the channel.

21. The industrial process control system claimed in claim 15 further comprising:
memory means for storing information groups received on said other communication channel by said second mentioned remote while the information group on said first-selected communication channel is tested for validity.

22. A system for controlling a process, said system including a plurality of process controlling remotes interconnected by a common communications link, said system comprising:
at least one process controlling remote for transmitting process control information in digital form, said information arranged in information groups of predetermined format and including an error detecting code word;
at least one other process controlling remote for receiving process control information in said information groups and testing the validity of the received groups based on said error detecting code word;

the communication link interconnecting said first-mentioned and said second-mentioned remotes including at least two independent communication channels, said first-mentioned remote transmitting identical information groups on each of said channels, said second-mentioned remote testing the validity of the received information groups on each communication channel and concluding the information transfer transaction if the received information group on at least one of said plural communication channels passes its validity check test.

23. The industrial process control system claimed in claim 22 wherein
said second-mentioned remote includes responding means for transmitting over said communications link an acknowledgement signal to said first-mentioned remote when the information group received over a first-selected communication channel is valid, for transmitting over said communications link an acknowledgement signal to said first-mentioned remote when the information group received over the other communication channel is found valid, and for transmitting over said communications link a non-acknowledgement signal to said first-mentioned remote when the information group received over said other communication channel is found invalid.

24. The industrial process control system claimed in claim 23 wherein
said first-mentioned remote is responsive to the non-acknowledgement signal from said second-mentioned remote to retransmit the invalidly received information group.

25. The industrial process control system claimed in claim 22 wherein
said first-mentioned remote is operable to transmit said information groups at least twice in succession on each communication channel.

26. The industrial process control system claimed in claim 25 wherein
said second-mentioned remote includes means to test the validity of the plural information groups received on a communications channel by effecting a comparison between the first-received and the second-received group.

27. The industrial process control system claimed in claim 22 further comprising:
memory means for storing the information groups received on one of said communication channels by said second-mentioned remote while the information groups received on the other communication channel is tested for validity.

28. A method for transferring digital information formatted in predetermined blocks between an information transmitting device and an interconnected information receiving device, said method comprising the steps of:
transmitting identical information blocks from a transmitter over plural independent communication channels to a receiver;
receiving and storing the received information blocks at the receiver;
selecting the information block received on one of said plural communication channels and testing the validity thereof;
selecting the information block received on the other of said communication channels and testing the validity thereof in the event the first-selected information block fails its validity check; and
requesting retransmission of said information blocks in the event both the first-selected and the second-selected information blocks fail their validity test.

29. The method claimed in claim 28 wherein said first-selection step further comprises the step of transmitting an acknowledgement signal from the receiver to the transmitter when the first-tested information block is found valid.

30. The method claimed in claim 29 wherein the second selection step further comprises the steps of transmitting an acknowledgement signal from the receiver to the transmitter when the second-tested information block is found valid.

31. The method claimed in claim 30 wherein the requesting step further comprises the step of transmitting a non-acknowledgement signal from the receiver to the transmitter when the second-tested information block is found invalid.

32. The method claimed in claim 31 further comprising the step of:
retransmitting the information blocks in response to a non-acknowledgement signal.

33. The method claimed in claim 32 further comprising the step of:
limiting the number of retransmissions to a predetermined value.

34. The method claimed in claim 29 wherein said transmitting step further comprises the step of transmitting identical information blocks on each channel at least twice in succession and the steps of testing the validity of an information block include a comparison between the first and second information blocks received on a channel.

35. In a control system of the type having a plurality of process control remotes interconnected through a communications link with each remote assigned a unique position in a predetermined succession order and each remote exercising supervisory control of the communication link on a revolving master basis, a method for transferring supervisory control of the communications link from a present system master to the next successive remote in the succession order comprising the steps of:
transmitting a control-transfer command signal along the communication link from the present system master to the next successive remote in the succession order;
receiving and evaluating the validity of the control-transfer command signal at the next successive remote;
sending an acknowledgement signal to the present system master from the next successive remote and accepting supervisory control of the communications link by the next successive remote from the present master if the control-transfer command signal is found valid by the next successive remote whereby the next successive remote becomes the present system master.

36. In a control system claimed in claim 35, said method further comprising the step of:
sending a non-acknowledgement signal from the next successive remote to the present system master if the evaluated control-transfer command signal if found invalid.

37. In a control system claimed in claim 36, said method further comprising the step of:

retransmitting the control-transfer command signal from the present master to said next successive remote in response to a non-acknowledgement signal from the next successive remote.

38. In a control system of the type having a plurality of process control remotes interconnected through a communications link with each remote assigned the unique position in a predetermined succession order and each remote exercising supervisory control of the communication link on a revolving master basis, each remote having a variable transfer monitor timer, a method for transferring supervisory control of the communication link from one remote to another comprising:

transmitting a control-transfer command signal along the communication link from the present system master to the next successive remote in the succession order;

setting, when said control-transfer command signal is transmitted from the present system master to the next successive master, the transfer-monitor time-out interval of at least the second successive remote from the present master to a time-out interval that is a function of a predetermined supervisory control transfer value and the position of the particular remote relative to the present master said method operating in a normal mode comprising the further steps of:

(1) receiving and evaluating the validity of the control transfer command signal at the next successive remote;

(2) sending an acknowledgement signal to the present system master from the next successive remote; and (3) accepting supervisory control of the communications link by the next successive remote from the present system master if the control transfer command signal is found valid by the next successive remote whereby the next successive remote becomes the present system master, said method operating in an abnormal mode comprising the further step of accepting supervisory control of the communications link by the second successive remote from the present system master in the event the transfer-monitor timer of such second successive remote times out before the first successive remote accepts supervisory control in said normal mode of operation.

39. In a control system for controlling an industrial process of the type that includes a plurality of remote units each connected to an associated input/output device and interconnected through a communications link and in which each remote is assigned a unique position in a predetermined succession order, 0, 1, 2, 3, ... m, ... n, and each remote accepts supervisory control of the communications link on a master for the moment basis in accordance with the succession order, a method for transferring supervisory control of the communications link from a present system master $R_m$ to the first successive remote $R_{m+1}$ comprising the steps of:

transmitting a control-transfer command signal through the communications link from the present system master $R_m$ to the next successive remote $R_{m+1}$;

evaluating the validity of the control-transfer command signal at the next successive remote $R_{m+1}$;

sending an acknowledgement signal through the communications link from the next successive remote $R_{m+1}$ to the present system master $R_m$ when the control-transfer command signal is found valid; and accepting supervisory control of the communications link by the next successive remote $R_{m+1}$ from the present master $R_m$ whereby the next successive remote $R_{m+1}$ becomes the present master $R_m$.

40. In a control system for controlling an industrial process of the type that includes a plurality of remote units each connected to an input/output device and interconnected through a common communications link and in which each remote is assigned a unique position in a predetermined succession order, 0, 1, 2, 3, ... m, ... n, and in which each remote accepts supervisory control of the communications link on a master for the moment basis and in which each remote includes a settable variable transfer-monitor timer, a method for sequentially transferring supervisory control of the communications link from the present master $R_m$ to the next successive remote $R_{m+1}$ in the succession order and for transferring supervisory control of the communications link from the present system master $R_m$ to the second successive remote $R_{m+2}$ in the event the next successive remote $R_{m+1}$ fails to accept supervisory control from the present system master $R_m$ comprising the steps of:

transmitting a control-transfer command signal through the communications link from the present system master $R_m$ to the next successive remote $R_{m+1}$;

setting the transfer-monitor timer of at least the second successive remote $R_{m+2}$ to a time-out interval based on a function of the successive remote's position relative to the present system master $R_m$;

said method in a normal mode of operation comprising the further steps of:

(1) evaluating the validity of the control-transfer command signal at the next successive remote $R_{m+1}$;

(2) sending an acknowledgement signal through the communications link from the next successive remote $R_{m+1}$ to the present system master $R_m$ when the control-transfer command signal is found valid; and (3) accepting syspervisory control of the communications link by the first successive $R_{m+1}$ from the present system master;

said method in an abnormal method of operation comprising the further step of:

accepting supervisory control of the communications link by the second successive remote $R_{m+2}$ when the transfer-monitor timer of the second successive remote $R_{m+2}$ times-out before the first successive remote $R_{m+1}$ accepts supervisory control of the communications link.

41. In a control system of the type having a plurality of process control remotes interconnected through a communications link with each remote assigned a unique position in a predetermined succession order and each remote exercising supervisory control of the communication link on a revolving master basis, a method for transferring supervisory control of the communications link from a present system master to the next successive remote in the succession order comprising the steps of:

transmitting a control-transfer command signal along the communication link from the present system master to the next successive remote in the succession order;

receiving and evaluating the validity of the control-system command signal at the next successive remote; and accepting supervisory control of the communication link by the next successive remote from the present master if the control-transfer command signal is found valid by the next successive remote, whereby the next successive remote becomes the present system master.

42. A system for controlling an industrial process, said system comprising:

a plurality of process controlling remotes, a common communication link interconnecting said remotes, each remote being assigned a unique position in a predetermined succession order and each remote exercising supervisory control of the communication link on a master for a moment basis in accordance with the succession order;

each remote including a means for transmitting digital information in block format over said communications link to the other of the remotes and each including receiver means for receiving digital information transmitted from one other of the remotes; and each remote including means for transferring the supervisory control to the next successive remote in the succession order by transmitting a control-transfer block over said communication link to the next successive remote in the succession order and the next successive remote accepting supervisory control of the communication link in response to said control-transfer block.

43. The system for controlling an industrial process claimed in claim 42, wherein:

each remote includes means for evaluating the validity of a received control-transfer block and for responding to a validly received control-transfer block by sending an acknowledgement signal to the transmitting remote to conclude the transfer of supervisory control.

44. The system for controlling an industrial process claimed in claim 43, wherein:

said evaluating means is operable to respond to an invalidly received control-transfer block by sending a non-acknowledgement signal to the transmitting remote.

45. The system for controlling an industrial process claimed in claim 44, wherein:

the transmitting remote in response to a non-acknowledgement signal to retransmit said control-transfer block.

* * * * *